(12) United States Patent
Rodriguez et al.

(10) Patent No.: US 11,336,685 B1
(45) Date of Patent: May 17, 2022

(54) CLOUD-NATIVE GLOBAL FILE SYSTEM WITH RAPID RANSOMWARE RECOVERY

(71) Applicant: Nasuni Corporation, Boston, MA (US)

(72) Inventors: Andres Rodriguez, Boston, MA (US); David M. Shaw, Newton, MA (US); John A. Capello, Cambridge, MA (US); Matthew J. Stech, Huntley, IL (US)

(73) Assignee: Nasuni Corporation, Boston, MA (US)

( * ) Notice: Subject to any disclaimer, the term of this patent is extended or adjusted under 35 U.S.C. 154(b) by 0 days.

(21) Appl. No.: 17/559,561

(22) Filed: Dec. 22, 2021

(51) Int. Cl.
G06F 11/00 (2006.01)
H04L 29/06 (2006.01)
G06F 11/14 (2006.01)
G06F 12/14 (2006.01)

(52) U.S. Cl.
CPC ...... *H04L 63/1466* (2013.01); *G06F 11/1469* (2013.01); *H04L 63/1416* (2013.01); *G06F 2201/84* (2013.01)

(58) Field of Classification Search
CPC ............. G06F 11/1469; G06F 2201/84; H04L 63/1466; H04L 63/1416
See application file for complete search history.

(56) References Cited

U.S. PATENT DOCUMENTS

| | | | | |
|---|---|---|---|---|
| 8,473,463 B1 * | 6/2013 | Wilk | ................... | G06F 11/1453 707/649 |
| 8,566,362 B2 * | 10/2013 | Mason, Jr. | .......... | G06F 16/9027 707/797 |
| 8,661,063 B2 * | 2/2014 | Mason, Jr. | .......... | G06F 16/1873 707/802 |
| 8,799,231 B2 * | 8/2014 | Mason, Jr. | .......... | G06F 11/1448 707/679 |
| 8,880,474 B2 | 11/2014 | Mason, Jr. et al. | | |
| 9,274,896 B2 | 3/2016 | Mason, Jr. et al. | | |
| 10,311,153 B2 * | 6/2019 | Mason, Jr. | .......... | G06F 16/1827 |
| 10,311,234 B2 * | 6/2019 | Bhashkar | ............... | G06F 21/568 |
| 10,318,743 B2 * | 6/2019 | Sinha | ........................ | H04L 63/12 |
| 10,341,355 B1 * | 7/2019 | Niemoller | ............... | H04L 67/10 |
| 10,438,000 B1 * | 10/2019 | Gu | ........................ | G06F 21/554 |
| 10,558,622 B2 * | 2/2020 | Shaw | ..................... | G06F 16/183 |
| 10,609,066 B1 * | 3/2020 | Nossik | ................ | H04L 63/1408 |
| 10,769,278 B2 * | 9/2020 | Chelarescu | ........... | G06F 21/566 |
| 10,791,133 B2 * | 9/2020 | Shukla | ..................... | G06F 21/55 |
| 10,956,575 B2 * | 3/2021 | Harsany | ................... | G06F 21/56 |
| 11,113,156 B2 | 9/2021 | Brewer et al. | | |

(Continued)

*Primary Examiner* — Gary S Gracia
(74) *Attorney, Agent, or Firm* — David H. Judson

(57) ABSTRACT

A cloud-native global file system, in which one or more filers are associated with a volume of a versioned files system in a private, public or hybrid cloud object store, is augmented to include a rapid ransomware recovery service. Upon detecting a ransomware attack associated with one or more files or directories of the volume, read and write access to the volume is restricted. A recovery filer is then activated or designated in the cloud. A restore operation is then initiated at the recovery filer. Following completion of the restore operation, a new clean (healthy) snapshot of the volume is then created using the recovery filer For any filer other than the recovery filer, a determination is made whether the filer has completed a merge operation with respect to the new clean snapshot. If so, read and write access to the volume is re-enabled from that filer.

14 Claims, 7 Drawing Sheets

(56) References Cited

U.S. PATENT DOCUMENTS

| | | | |
|---|---|---|---|
| 2017/0206353 A1* | 7/2017 | Jai | G06F 21/565 |
| 2018/0007069 A1* | 1/2018 | Hunt | G06F 21/566 |
| 2018/0102902 A1* | 4/2018 | Yang | G06F 21/44 |
| 2018/0157834 A1* | 6/2018 | Continella | G06F 21/554 |
| 2018/0246728 A1* | 8/2018 | Adams | G06F 9/44505 |
| 2019/0050299 A1* | 2/2019 | Rowe | H04L 63/1441 |
| 2019/0235973 A1* | 8/2019 | Brewer | G06F 11/1469 |
| 2019/0370123 A1* | 12/2019 | Heckel | G06F 11/1484 |
| 2020/0042707 A1* | 2/2020 | Kucherov | G06F 3/0683 |
| 2020/0099699 A1* | 3/2020 | Saad | G06F 11/2076 |
| 2020/0159624 A1* | 5/2020 | Malkov | G06N 20/00 |
| 2020/0167463 A1* | 5/2020 | Adams | G06F 21/57 |
| 2020/0311280 A1* | 10/2020 | Byrne | G06N 20/00 |
| 2020/0342106 A1* | 10/2020 | Chelarescu | G06F 21/567 |
| 2021/0026961 A1* | 1/2021 | Underwood | G06F 21/566 |
| 2021/0044604 A1* | 2/2021 | Annen | G06F 11/1484 |
| 2021/0224379 A1* | 7/2021 | Pientka | G06F 21/568 |
| 2021/0405889 A1* | 12/2021 | Trika | G06F 12/0292 |

\* cited by examiner

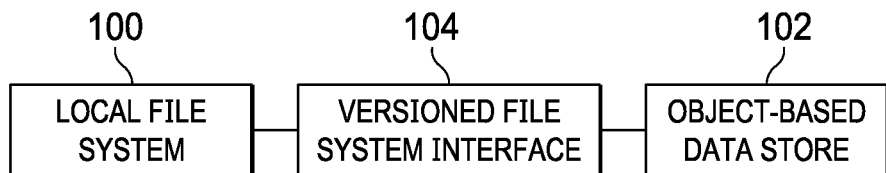
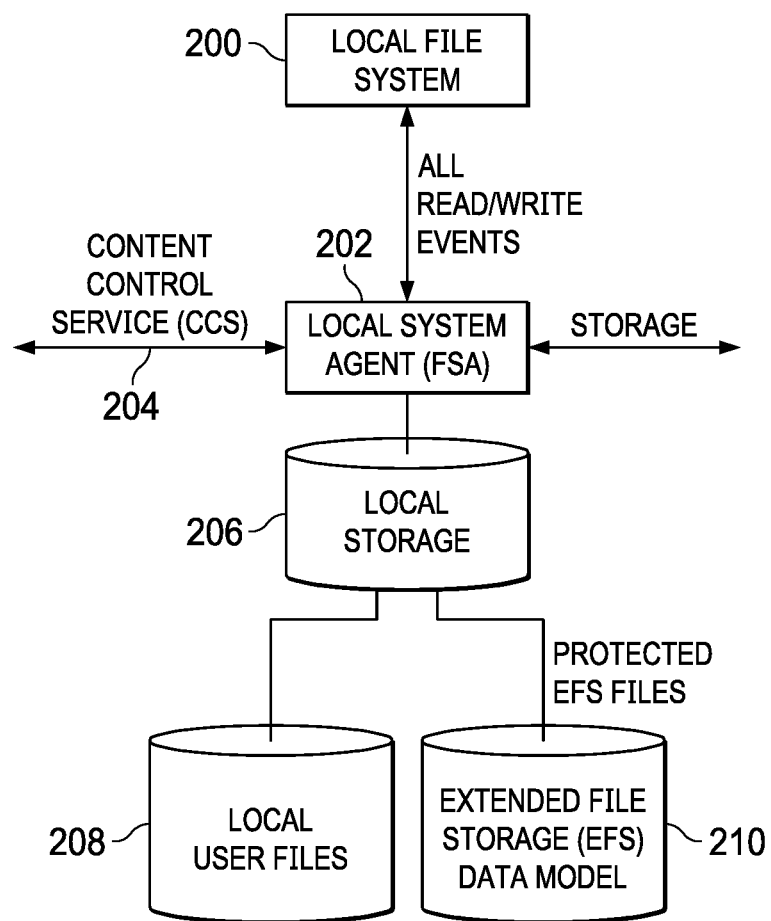

CLOUD-NATIVE GLOBAL FILE SYSTEM WITH RAPID RANSOMWARE RECOVERY

BACKGROUND OF THE INVENTION

Technical Field

This application relates generally to data storage.

Background of the Related Art

It is known to provide a cloud-native global file system that is used to provide primary file storage for enterprise data. In this approach, edge appliances (or "filers") typically located on-premises securely transmit all files, file versions and metadata to a preferred private or public cloud object store, while locally caching only active files. The appliances are stateless, and multiple appliances can mount the same volume in the cloud. As files are written locally, an authoritative copy of every file and metadata (inodes) are stored in the cloud. The system provides a single, unified namespace for all primary file data that is not bound by local hardware or network performance constraints. The above-described approach to enterprise file services also has been extended to provide multiple-site/multiple-filer access to the same namespace, thereby enabling participating users with the ability to collaborate on documents across multiple filers/sites. Major cloud platforms, e.g., Amazon® AWS, Microsoft® Azure, Google® Cloud and others, are then utilized as a write-once, read many object store for the enterprise primary file data, which is typically stored in volumes. A solution of this type is available commercially from Nasuni® Corporation of Boston, Mass.

Ransomware is a type of malware attack that threatens to publish the victim's personal data or perpetually block access to it unless a ransom is paid. While some simple ransomware may lock the system so that it is not difficult for a knowledgeable person to reverse, more advanced malware encrypts the victim's files, making them inaccessible, and demands a ransom payment to decrypt them. While many attacks are likely unreported due to privacy and other concerns, there are an estimated 1,000 ransomware attacks per day. The Covid-19 pandemic has exacerbated the problem by forcing companies to increase access to remote users. Remote access has been the accelerate in what was already a volatile ecosystem made up of rogue states (money laundering machines) and the broad acceptance of cryptocurrency (an untraceable payment mechanism). All of this has turned ransomware, almost overnight, into a very big business, and into a very big problem for businesses.

Techniques for ransomware detection are well-known in the art. Representative approaches to this problem are quite varied, from rule-based or heuristic-based behavior analysis (e.g., based on user or system activity), machine learning, and other deterministic or probabilistic methods and systems. It is also known in the prior art to provide for recovery from a ransomware attack once detected. Recovery typically involves use of backup images or snapshots that are retrievable to the impacted system, e.g., from a cloud data storage. While known ransomware detection and mitigation techniques of this type provide advantages, recovery times (recoverability) is slow and tedious, primarily as a function of limitations in backup restore technologies in general. Traditional backup/restore relies on copying data back from a backup media server to the file server(s) that have been corrupted by the ransomware attack. Moreover, once an organization is compromised, it is common for the ransomware to distribute the attack across multiple file servers, and an enterprise may have many file server(s) located in different places and in the cloud. The bottleneck is the time it takes to write all of that data and metadata back to the corrupted file server. This limitation is not due to any specific backup technology but something that it true across all backup/restore systems that are not also the primary file server and therefore require the backup data to be copied back from the backup media server to the file server. In particular, file server backup typically requires long restores, with long recovery times, as the backup copy-back operation that is necessary to restore a file server is very slow. The problem is exacerbated as the number of affected file servers increases, as the output bandwidth of the backup media server itself then becomes an additional bottleneck for the performance of the overall restore operation. Commonly, IT operators are forced to triage and serialize the file server restores according to how critical the affected file servers are to the organization. This adds complexity, frustration and time to the complete restore of all file servers implicated in the attack.

Thus, there remains a long-felt need to provide more efficient (rapid) recovery methods and system for ransomware attacks.

BRIEF SUMMARY

A cloud-native global file system, in which one or more filers are associated with a volume of a versioned files system in a private, public or hybrid cloud object store, is augmented to include a rapid ransomware recovery service. Upon detecting a ransomware attack associated with one or more files or directories of the volume, read and write access to the volume from the one or more filers that share the volume is restricted. A recovery filer is then activated or designated in the cloud. A restore operation is then initiated, e.g., using audit trails, at the recovery filer. Upon completion of the restore, a new clean (healthy) snapshot of the volume is then created using the recovery filer. Thereafter, access to the volume is re-enabled. For any filer other than the recovery filer, access is re-enabled only after a determination that the given filer has completed a merge operation with respect to the new clean snapshot. The above-described recovery is rapid, as there is no requirement for copy back operations as in conventional backup-based restore techniques.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which:

FIG. 1 is a block diagram illustrating how a known versioned file system interfaces a local file system to an object-based data store;

FIG. 2 is a block diagram of a representative implementation of a portion of the interface shown in FIG. 1;

DETAILED DESCRIPTION

Figure 3:
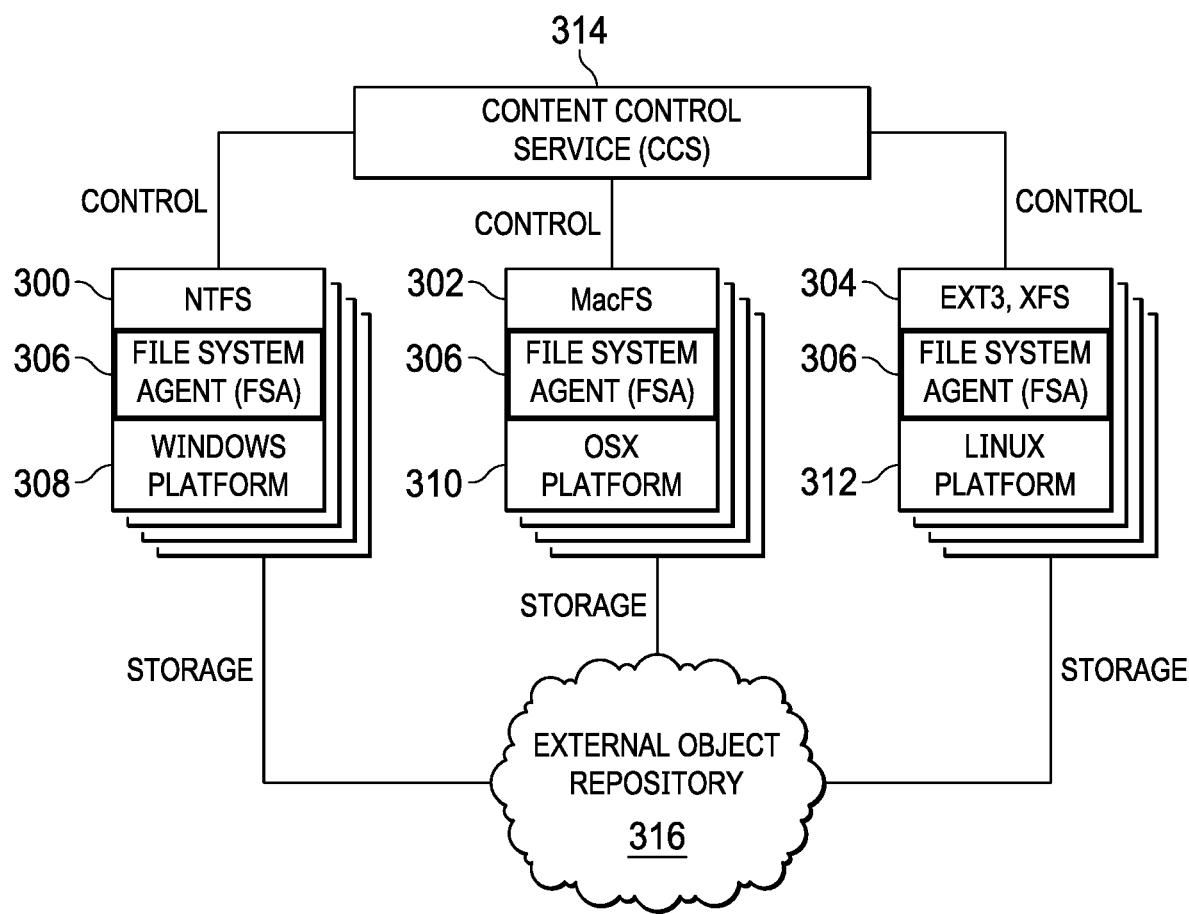
FIG. 3 is a more detailed implementation of the interface where there are a number of local file systems of different types.

FIG. 1 illustrates a local file system 100 and an object-based data store 102. Although not meant to be limiting, preferably the object-based data store 102 is a "write-once" store and may comprise a "cloud" of one or more storage service providers. An interface 104 (or "filer") provides for a "versioned file system" that only requires write-once behavior from the object-based data store 102 to preserve substantially its "complete" state at any point-in-time. As used herein, the phrase "point-in-time" should be broadly construed, and it typically refers to periodic "snapshots" of the local file system (e.g., once every "n" minutes). The value of "n" and the time unit may be varied as desired. The interface 104 provides for a file system that has complete data integrity to the cloud without requiring global locks. In particular, this solution circumvents the problem of a lack of reliable atomic object replacement in cloud-based object repositories. The interface 104 is not limited for use with a particular type of back-end data store. When the interface is positioned in "front" of a data store, the interface has the effect of turning whatever is behind it into a "versioned file system" ("VFS"). The VFS is a construct that is distinct from the interface itself, and the VFS continues to exist irrespective of the state or status of the interface (from which it may have been generated). Moreover, the VFS is self-describing, and it can be accessed and managed separately from the back-end data store, or as a component of that data store. Thus, the VFS (comprising a set of structured data representations) is location-independent. In one embodiment, the VFS resides within a single storage service provider (SSP) although, as noted above, this is not a limitation. In another embodiment, a first portion of the VFS resides in a first SSP, while a second portion resides in a second SSP. Generalizing, any given VFS portion may reside in any given data store (regardless of type), and multiple VFS portions may reside across multiple data store(s). The VFS may reside in an "internal" storage cloud (i.e., a storage system internal to an enterprise), an external storage cloud, or some combination thereof.

The interface 104 may be implemented as a machine. A representative implementation is the Nasuni® Filer, available from Nasuni® Corporation of Boston, Mass. Thus, for example, typically the interface 104 is a rack-mounted server appliance comprising hardware and software. The hardware typically includes one or more processors that execute software in the form of program instructions that are otherwise stored in computer memory to comprise a "special purpose" machine for carrying out the functionality described herein. Alternatively, the interface is implemented as a virtual machine or appliance (e.g., via VMware®, or the like), as software executing in a server, or as software executing on the native hardware resources of the local file system. The interface 104 serves to transform the data representing the local file system (a physical construct) into another form, namely, a versioned file system comprising a series of structured data representations that are useful to reconstruct the local file system to any point-in-time. A representative VFS is the Nasuni Unity File System (UniFS®). Although not meant to be limiting, preferably each structured data representation is an XML document (or document fragment). As is well-known, extensible markup language (XML) facilitates the exchange of information in a tree structure. An XML document typically contains a single root element (or a root element that points to one or more other root elements). Each element has a name, a set of attributes, and a value consisting of character data, and a set of child elements. The interpretation of the information conveyed in an element is derived by evaluating its name, attributes, value and position in the document.

The interface 104 generates and exports to the write-once data store a series of structured data representations (e.g., XML documents) that together comprise the versioned file system. The data representations are stored in the data store. Preferably, the XML representations are encrypted before export to the data store. The transport may be performed using known techniques. In particular, REST (Representational State Transfer) is a lightweight XML-based protocol commonly used for exchanging structured data and type information on the Web. Another such protocol is Simple Object Access Protocol (SOAP). Using REST, SOAP, or some combination thereof, XML-based messages are exchanged over a computer network, normally using HTTP (Hypertext Transfer Protocol) or the like. Transport layer security mechanisms, such as HTTP over TLS (Transport Layer Security), may be used to secure messages between two adjacent nodes. An XML document and/or a given element or object therein is addressable via a Uniform Resource Identifier (URI). Familiarity with these technologies and standards is presumed.

FIG. 2 is a block diagram of a representative implementation of how the interface captures all (or given) read/write events from a local file system 200. In this example implementation, the interface comprises a file system agent 202 that is positioned within a data path between a local file system 200 and its local storage 206. The file system agent 202 has the capability of "seeing" all (or some configurable set of) read/write events output from the local file system. The interface also comprises a content control service (CCS) 204 as will be described in more detail below. The content control service is used to control the behavior of the file system agent. The object-based data store is represented by the arrows directed to "storage" which, as noted above, typically comprises any back-end data store including, without limitation, one or more storage service providers. The local file system stores local user files (the data) in their native form in cache 208. Reference numeral 210 represents that portion of the cache that stores pieces of metadata (the structured data representations, as will be described) that are exported to the back-end data store (e.g., the cloud).

FIG. 3 is a block diagram illustrating how the interface may be used with different types of local file system architectures. In particular, FIG. 3 shows the CCS (in this drawing a Web-based portal) controlling three (3) FSA instances. Once again, these examples are representative, and they should not be taken to limit the invention. In this example, the file system agent 306 is used with three (3) different local file systems: NTFS 300 executing on a Windows operating system platform 308, MacFS (also referred to as "HFS+" (HFSPlus)) 302 executing on an OS X operating system platform 310, and EXT3 or XFS 304 executing on a Linux operating system platform 312. These local file systems may be exported (e.g., via CIFS, AFP, NFS or the like) to create a NAS system based on VFS. Conventional hardware, or a virtual machine approach, may be used in these implementations, although this is not a limitation. As indicated in FIG. 3, each platform may be controlled from a single CCS instance 314, and one or more external storage service providers may be used as an external object repository 316. As noted above, there is no requirement that multiple SSPs be used, or that the data store be provided using an SSP.

Figure 4:
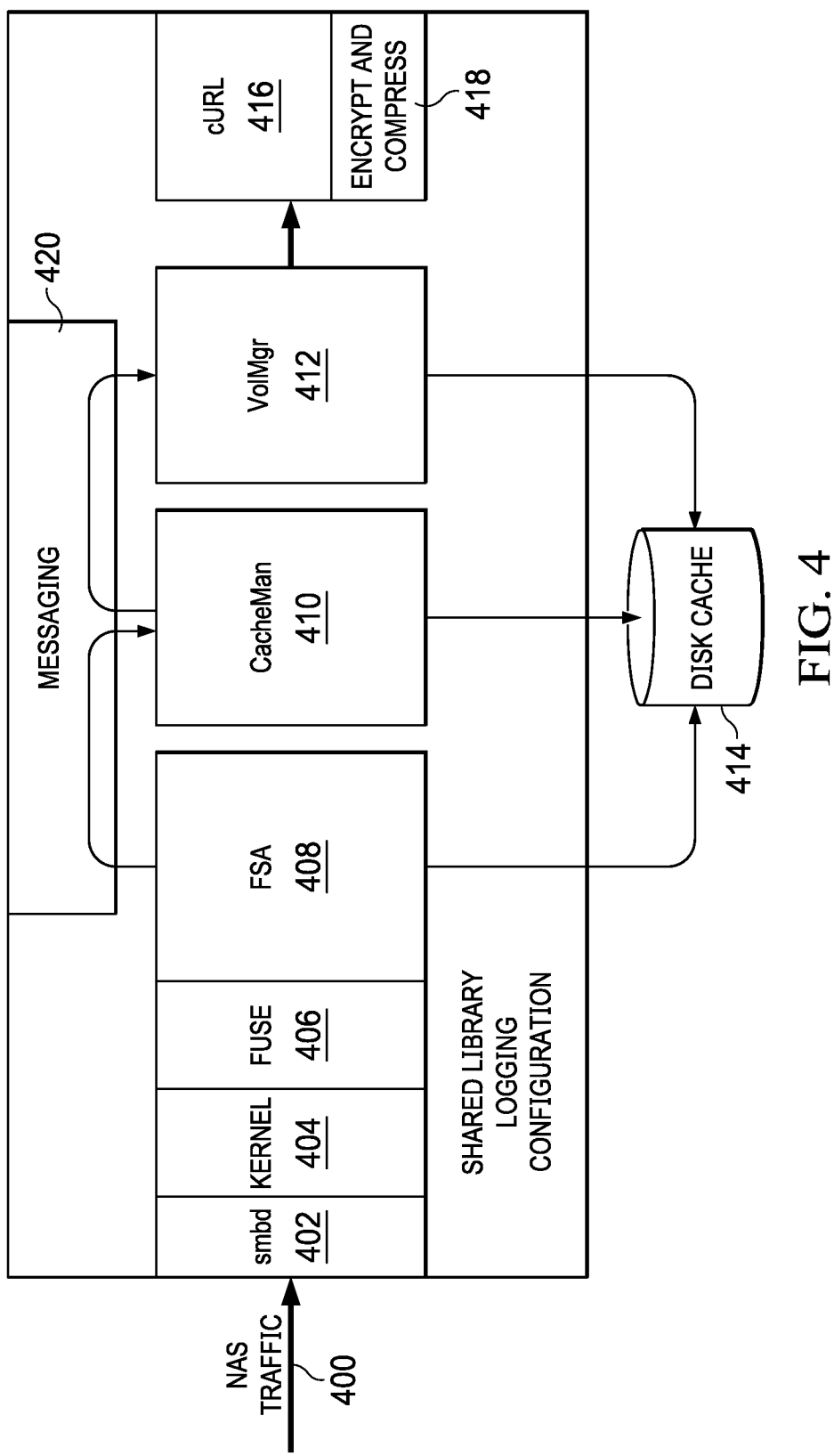
FIG. 4 illustrates the interface implemented as an appliance within a local processing environment.

FIG. 4 illustrates the interface implemented as an appliance within a local processing environment. In this embodiment, the local file system traffic 400 is received over Ethernet and represented by the arrow identified as "NAS traffic." That traffic is provided to smbd layer 402, which is a SAMBA file server daemon that provides CIFS (Windows-based) file sharing services to clients. The layer 402 is managed by the operating system kernel 404 is the usual manner. In this embodiment, the local file system is represented (in this example) by the FUSE kernel module 406 (which is part of the Linux kernel distribution). Components 400, 402 and 404 are not required to be part of the appliance. The file transfer agent 408 of the interface is associated with the FUSE module 406 as shown to intercept the read/write events as described above. The CCS (as described above) is implemented by a pair of modules (which may be a single module), namely, a cache manager 410, and a volume manager 412. Although not shown in detail, preferably there is one file transfer agent instance 408 for each volume of the local file system. The cache manager 410 is responsible for management of "chunks" with respect to a local disk cache 414. This enables the interface described herein to maintain a local cache of the data structures (the structured data representations) that comprise the versioned file system. The volume manager 412 maps the root of the FSA data to the cloud (as will be described below), and it further understands the one or more policies of the cloud storage service providers. The volume manager also provides the application programming interface (API) to these one or more providers and communicates the structured data representations (that comprise the versioned file system) through a transport mechanism 416 such as cURL. cURL is a library and command file tool for transferring files with URL syntax that supports various protocols such as FTP, FTPS, HTTP, HTTPS, SCP, SFTP, TFTP, TELNET, DICT, LDAP, LDAPS and FILE. cURL also supports SSL certificates, HTTP POST, HTTP PUT, FTP uploading, HTTP form based upload, proxies, cookies, user+password authentication, file transfer resume, proxy tunneling, and the like. The structured data representations preferably are encrypted and compressed prior to transport by the transformation module 418. The module 418 may provide one or more other data transformation services, such as duplicate elimination. The encryption, compression, duplicate elimination and the like, or any one of such functions, are optional. A messaging layer 420 (e.g., local socket-based IPC) may be used to pass messages between the file system agent instances, the cache manager and the volume manager. Any other type of message transport may be used as well.

The interface shown in FIG. 4 may be implemented as a standalone system, or as a managed service. In the latter case, the system executes in an end user (local file system) environment. A managed service provider provides the system (and the versioned file system service), preferably on a fee or subscription basis, and the data store (the cloud) typically is provided by one or more third party service providers. The versioned file system may have its own associated object-based data store, but this is not a requirement, as its main operation is to generate and manage the structured data representations that comprise the versioned file system. The cloud preferably is used just to store the structured data representations, preferably in a write-once manner, although the "versioned file system" as described herein may be used with any back-end data store.

As described above, the file system agent 408 is capable of completely recovering from the cloud (or other store) the state of the native file system and providing immediate file system access (once FSA metadata is recovered). The FSA can also recover to any point-in-time for the whole file system, a directory and all its contents, a single file, or a piece of a file.

Figure 5:
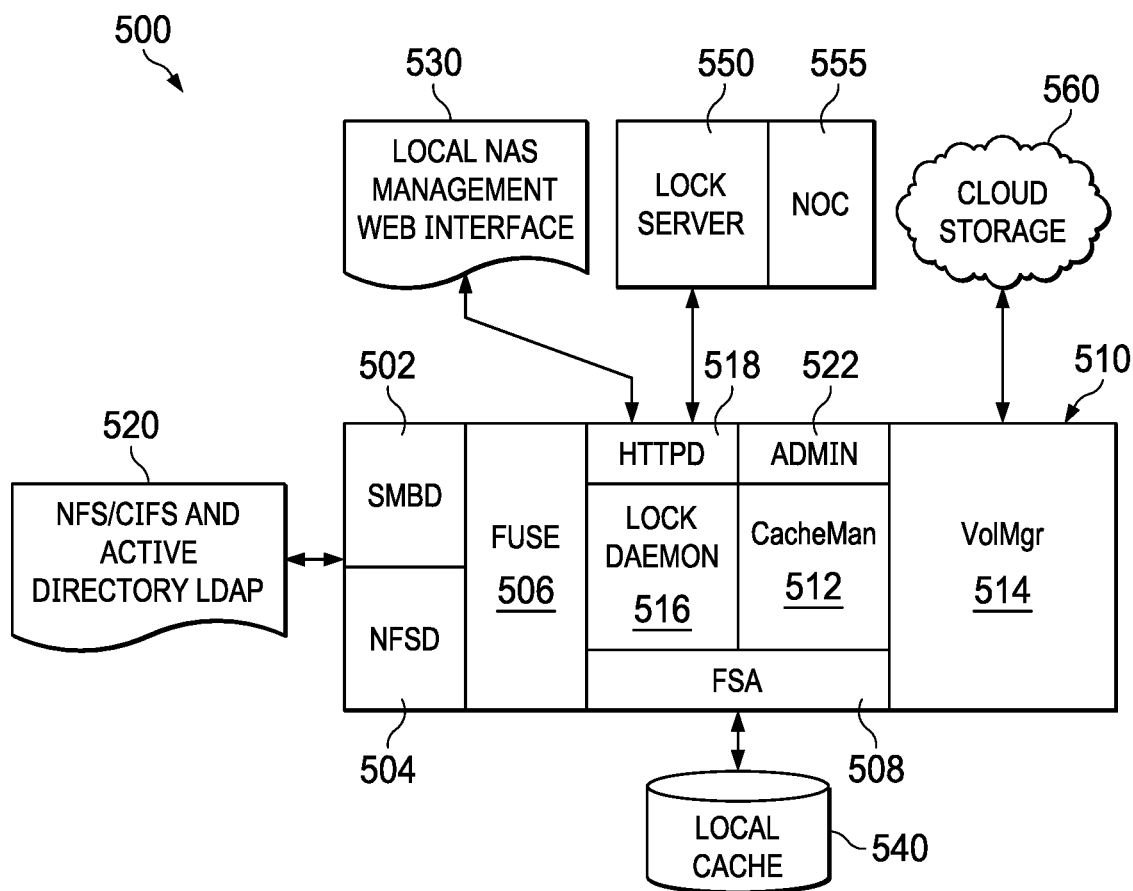
FIG. 5 depicts a versioned file system that implements global file locking.

FIG. 5 is a block diagram that illustrates a system 500 for managing a versioned file system (as described above) that also includes the capability of global locking. The system 500 includes an interface 510 in communication with local traffic 520, a web-based portal 530, a local cache 540, a lock server 550, and cloud storage 560. The interface 510 includes a SMBD layer 502, a NFSD layer 504, a FUSE module 506, a FSA 508, a cache manager 512, a volume manager 514, a lock daemon 516, a transport layer 518, and an administrative module 522. In some embodiments, the interface 510 is the same as the interface described with respect to FIG. 4 but with the addition of the lock daemon 516.

Fast Restore

As noted, preferably the versioned file system (VFS) comprises a set of structured data representations such as XML documents and document fragments. Names are object references that typically are not parsed by the system. The handle names typically have no relation to the actual file names or content. The handle names in the XML preferably are prefixed with a length component. Also, for items other than the table of contents (TOC), the path and version elements in the XML are informative and need not be used by the system. The "path" typically represents the originating path (in the local file system) when the item was last updated. The "version" typically represents the version of root at the time the item was last updated. The table of contents (TOC) is a table at the head of every version; preferably, the TOC contains references to all versions.

During a restore, preferably metadata is pulled back from the cloud first, so users can see the existence of needed files immediately. The remainder of the data is then pulled back from the cloud if/when the user goes to open the file. As a result, the entire file system (or any portion thereof, including a single file) can be restored to a previous time nearly instantaneously. The metadata appears first (and is stitched into the file system, where it remains available for immediate use), and then the cache gradually fills with the associated files as they are requested (and as they are streamed back from the cloud). From the user's perspective, however, it will appear as if the data is actually present (restored) once merely the metadata is returned.

A "fast" restore is said to be performed if an object being restored exists within a "borrow window" of the version from which the system is restoring. During a fast restore, the file (or, more generally, file system portion) being restored is associated into a new place in the file system, which results in two identifiers (e.g., filenames) within the file system pointing to the same (single) object. As noted above, the metadata for the file (or file system portion) being restored is pulled back from the cloud first, so users can see the existence of needed files immediately. The remainder of the data is then pulled back from the cloud if/when the user goes to open the file. This enables the file system portion to be restored to a previous time nearly instantaneously.

Typically, a restore is triggered by a user choosing to restore his/her/its data. In a representative embodiment, a user opens an interface (e.g., a web-based UI) and selects a file (data, time, snapshot, etc.) and selects a "restore" button. The system determines whether the restore will proceed on a "fast" basis based on a "borrow window." By way of brief background, each version in the versioned file system is identified as a particular version (typically by a version number) and has associated therewith a "borrow window," which preferably is an integer value. A most-recently created version is a "current" version. In the context of a fast restore operation, the borrow window of interest is the borrow window of the older version from which an object is being restored. As used herein, this construct is sometimes referred to as the "restore" borrow window. Each individual version has its own associated borrow window, and for a set of versions, each borrow window may be different. A "borrow window" is sometimes referred to as a "borrowing window" or "window."

If a user-initiated restore requires objects from a version outside the restore borrow window, the system performs a "slow restore" (with respect to versions outside the restore borrow window) to copy from an old version to the latest version as necessary. The word "slow" in the phrase "slow restore" does not necessarily have temporal implications; by definition, a "slow restore" is a state or status associated with a new file that just happens to have the same name and content as an older file. The metadata for a new file, like all new files, is available when the file is written.

The following describes additional details of a preferred "fast restore" functionality. As noted above, generally this function works by borrowing dependencies from one or more prior versions. Suppose it is desired to restore file "/A/B/C" from version X to the current version Y at "/A/B/C." As noted above, a version has a "borrow window" value (typically an integer), which value preferably is advertised. The borrow window for a version may differ from the borrowing window from another version. The fast restore process begins by determining the "version created" of all chunks of "/A/B/C/" in version X. For each chunk i in the manifest, the fast restore operation sets the "version created" of i be $V_i$. Then, a fast restore is permitted if and only if, for all i, $(Y-V_i)$ is less than or equal to the borrowing window advertised by version $V_i$. If this condition is met (at an individual object level), the fast restore function proceeds as follows.

The manifest for "/A/B/C" in version X is already present in the cloud. Its handle is obtained. Then, a new directory entry "C" in created in "/A/B." This directory entry includes the same attributes as "/A/B/C" from X (this is the borrowing), as well as the handle of the original file manifest that was just obtained. A next push then commits the modified directory "A/B" to the cloud. As a result, the chunk objects and manifest of "A/B/C" are now referenced from different versions X and Y.

Figure 6:
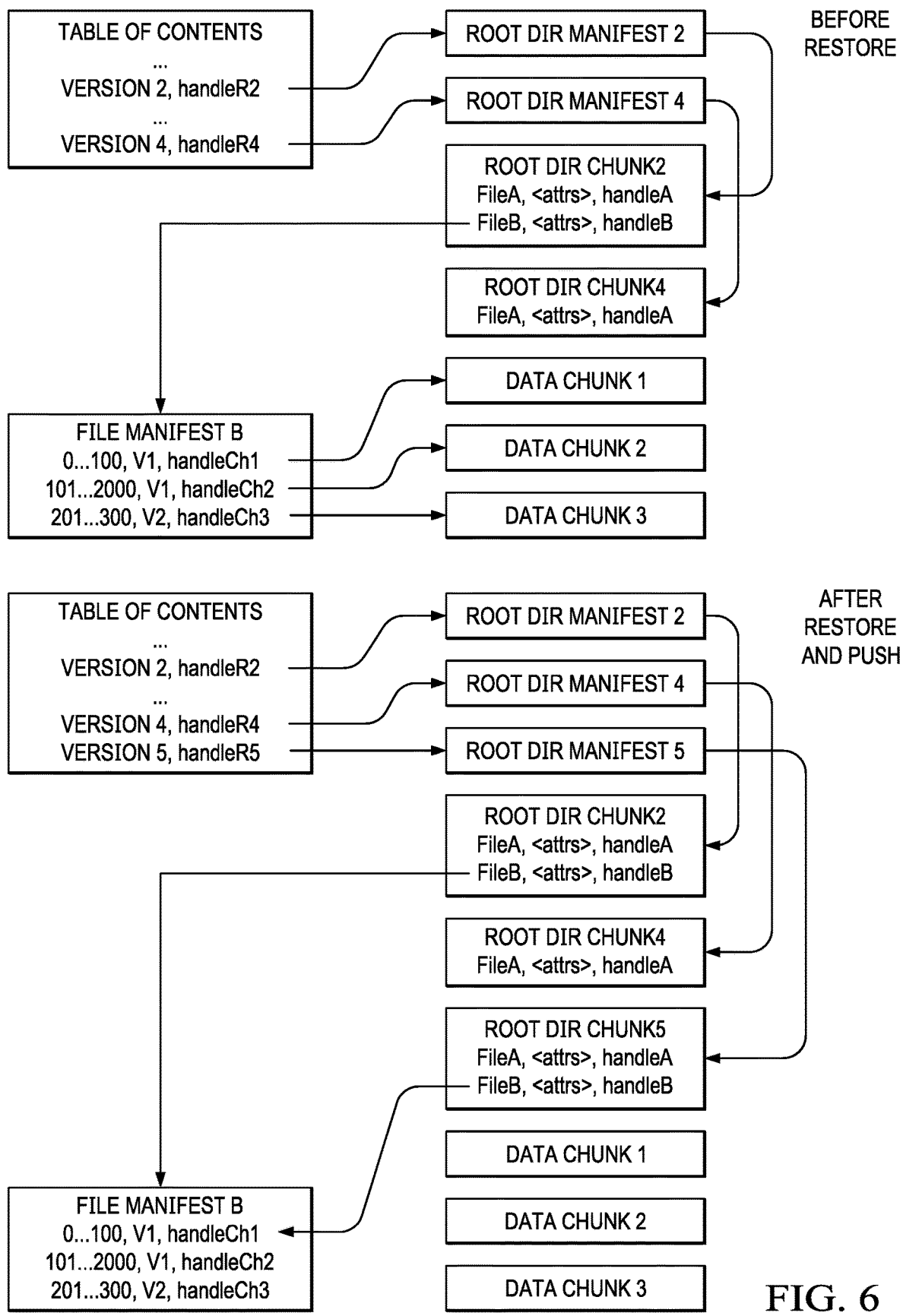
FIG. 6 depicts a fast restore operation in the cloud native global file system.

FIG. 6 illustrates the fast restore process by way of example. This is a fast restore of a File B from version 2, to a current version. Before the restore, the latest version in the cloud (version 4) has no File B. After the restore and a push of version 5, the latest version in the cloud (version 5) has an entry for File B, which entry points directly to the original manifest. There are now two entries pointing to the same manifest, and the manifest is referenced from version 2 and version 5. The data chunks of B are referenced from the single manifest.

For more details concerning the fast restore process, the disclosure of U.S. Pat. No. 8,799,231 is hereby incorporated by reference.

The above-described techniques provide the ability to share independent volumes that are established by distinct filers. This conserves storage space in the cloud, does not require the use of shadow volumes, does not require snapshots to alternate between or among filers, facilitates near-live sharing of files even before a snapshot is complete, maintains synchronous snapshot of file system capability, and enables multiple volumes to have independent histories without twice the data being persisted in the cloud.

The filers may be anywhere geographically, and no network connectivity between or among the filers is required (provided filers have a connection to the service).

More generally, sharing enables multi-site access to a single shared volume. The data in the volume is 100% available, accessible, secure and immutable. The approach has infinite scalability and eliminates local capacity constraints. The sites (nodes) may comprise a single enterprise environment (such as geographically-distributed offices of a single enterprise division or department), but this is not a requirement, as filers are not required to comprise an integrated enterprise, though practical limitations (e.g., security) can dictate whether multiple enterprises can share access to a common file system. This enables partners to share the file system (and thus particular volumes therein) in the cloud. Using the service provider-supplied interfaces, which are preferably web-based, the permitted users may set up a sharing group and manage it. Using the sharing approach as described, each member of the sharing group in effect "sees" the same volume. Thus, any point-in-time recovery of the shared volume is provided, and full read/write access is enabled from each node in the sharing group.

The above-described services platform consolidates an enterprise's Network Attached Storage (NAS) and file server silos in cloud storage, delivering infinite scale, built-in backup, global file sharing, and local file server performance. A commercial implementation of these technologies is a software-as-a-service (SaaS) platform is available from Nasuni Corporation. Enterprise customer data is stored on one or more third party clouds in a write-once, read-many (WORM) manner in a platform-specific format, namely, UniFS®-formatted volumes. This solution provides NAS consolidation, backup and recovery modernization, multi-site file sharing, and rapid, infrastructure-free disaster recovery, while also serving as a foundation for data analytics and multi-cloud IT initiatives in a manner that is now described.

Rapid Ransomware Recovery

With the above as background, the techniques of this disclosure are now described. As noted above, the recovery technique herein leverages the basic architecture of the global file system itself, wherein as described above unlimited, immutable versions of an enterprise file system are saved to cloud object store. Because the global file system stores versions of every change in the file system, a ransomware recovery operation is done without having to copy any data from previous/unaffected versions of the cloud-native global file system. Rather, and because there is no requirement for a copy back operation, the approach herein enables true rapid recovery from a ransomware attack.

Figure 7:
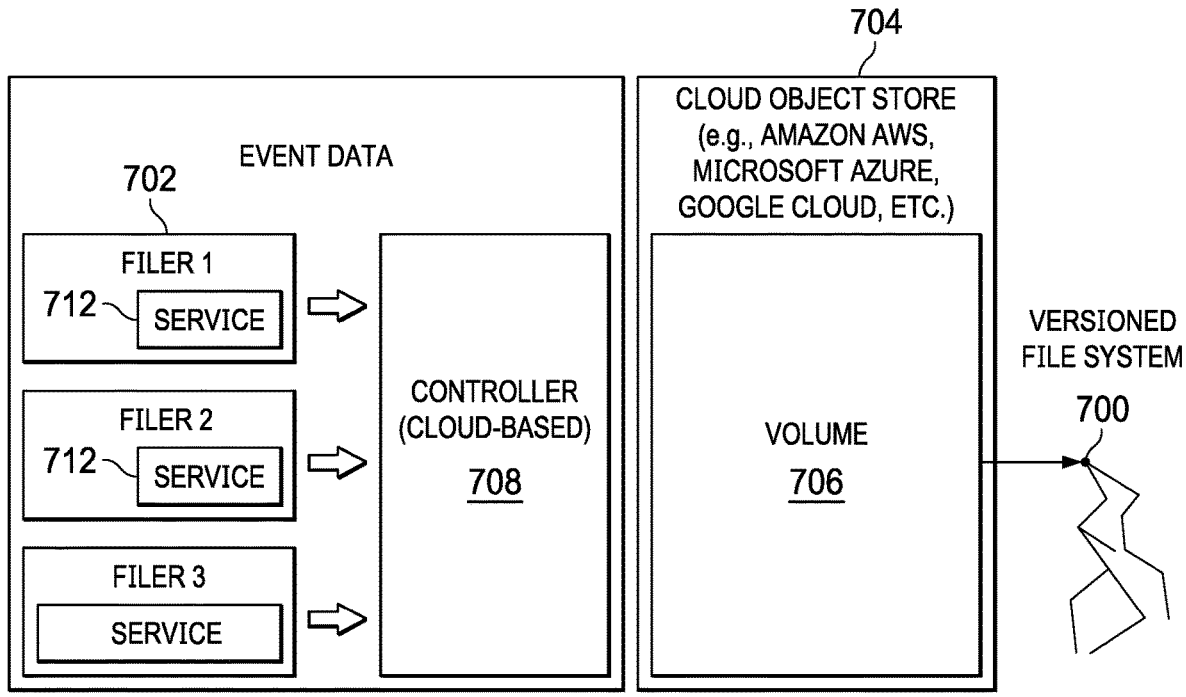
FIG. 7 depicts a set of enterprise appliances/filers associated with a central cloud controller that provides a rapid ransomware recovery service according to this disclosure.

FIG. 7 depicts a representative operating environment wherein a cloud-native global (versioned) file system 700 is used to provide primary file storage for a volume 707 of enterprise data. In this approach, edge appliances ("EAs" or "filers") 702, which are located on-premises or configured as virtual machines (in a cloud), securely transmit all files, file versions and metadata to a preferred private or public cloud object store 704, while locally caching only active files. The appliances are stateless, and multiple appliances can mount the same volume 706 in the cloud. A cloud-based controller 708 interoperates with the filers 702, providing various services. Each filer 702 also includes a synchronization service 712 by which the EA 702 is synchronized against a latest (healthy) snapshot (of the above-described versioned file system), e.g., if it is sharing the same volume 706, wherein the latest snapshot is one of the immutable version(s).

Figure 8:
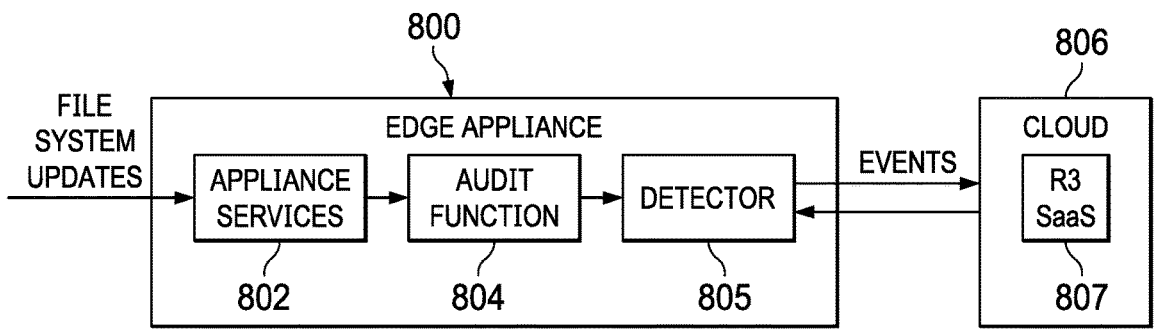
FIG. 8 depicts how a filer interoperates with the central cloud controller in a representative embodiment.

FIG. 8 depicts a representative filer 800 and its interoperation with the cloud-based controller 806 to facilitate the rapid ransomware recovery service of this disclosure. In this example, an edge appliance (EA) 800—such as depicted in FIG. 4 or FIG. 5 and described above—comprises a set of local appliance services 802 that receive and process file system updates. The appliance services 802 provides information to an audit component 804. The appliance 800 further includes a ransomware detector 805 coupled to the audit component 804. Ransomware detector 805 interoperates with a rapid ransomware recovery (R3) service 807, typically hosted in cloud controller 808. In one embodiment, the rapid ransomware recovery service 807 is implemented as a Python-based service. It provides a set of features, preferably with respect to a single volume per account under rapid ransomware recovery control. In this manner, and excepting the volume affected, other volumes in the system are unaffected. A volume that is managed for rapid ransomware recovery (R3) by the service 807 according to this disclosure is sometimes referred to as an "R3-enabled volume."

In operation, the ransomware detector 805 reads audit events from the audit component 804 and detects whether a ransomware attack is occurring (or has occurred). Ransomware detector 805 also identifies, and with respect to the immutable version(s), the infection point of the ransomware attack. The fact of the attack and the identified infection point are provided to the R3 service 807 to facilitate automated ransomware recovery, as will be described in detail below. The audit component 804 monitors/tracks all file system updates that are occurring in the local enterprise file system to which the EA/filer is coupled. For ransomware attack detection, these file system updates includes sequential read and write operations that are a signature trait of ransomware file encryptions, in other words, the existence of a ransomware attack. The particular nature and operation of the ransomware detector 805, however, is not limited to a specific ransomware attack vector, as the detector preferably is implementation-specific, and one or more different ransomware detection methods may be implemented therein. In general, the ransomware detector 805 operates to capture the signature of the ransomware attack. Known ransomware detection methods typically track user- and other system-behaviors, and apply deterministic and/or probabilistic approaches to detecting whether and when (and with respect to what resources) a ransomware attack has occurred. The detector 807 itself may implement learning methods so that it learns over time what is correct or appropriate behavior with respect to the file system. Depending on the method utilized, ransomware detection may be off-loaded in whole or in part to the cloud-based controller. An example would be a machine learning-based approach, which may have more computation or storage requirements. There is no requirement for any particular detection technique to be applied, as the focus of the subject matter herein primarily concerns the speed of recovery from such an attack.

Figure 9:
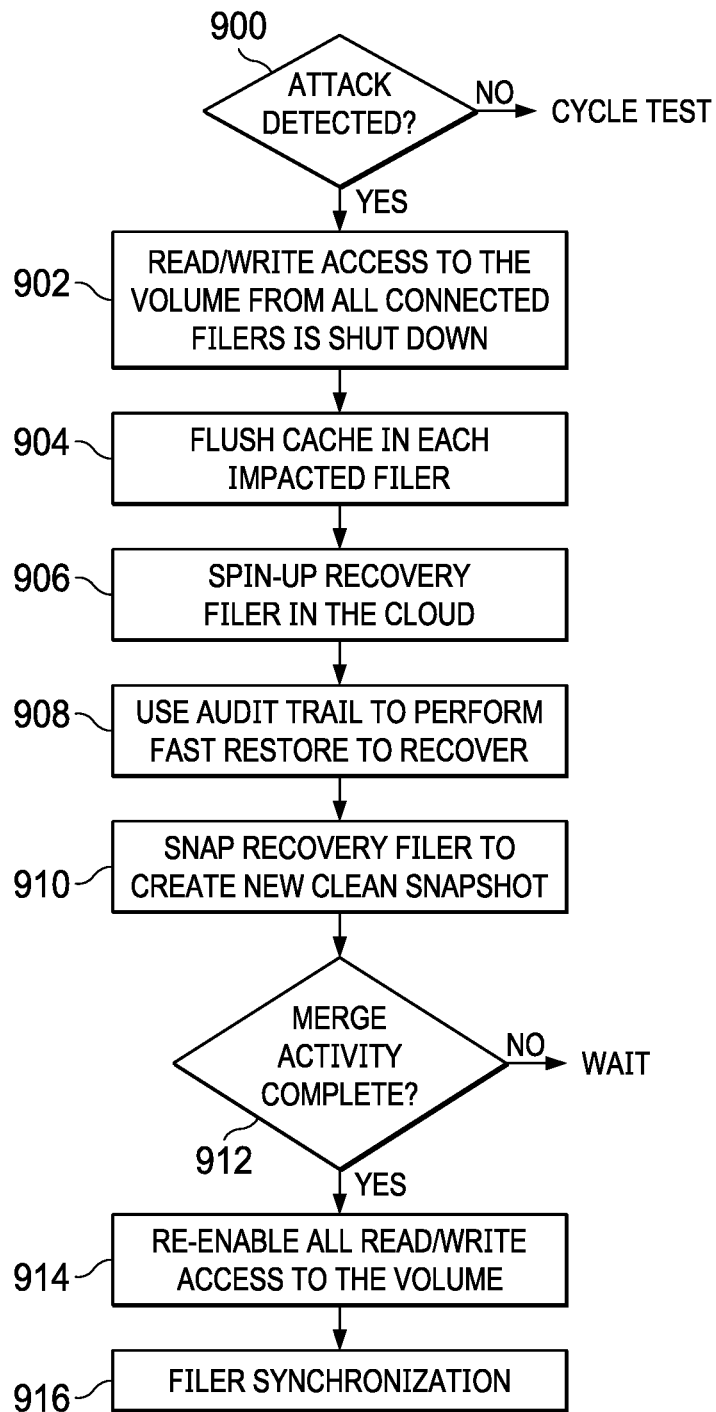
FIG. 9 depicts a process flow for a technique for rapid ransomware recovery according to this disclosure.

FIG. 9 depicts a representative process flow for rapid ransomware recovery according to the techniques of this disclosure. As will be described, the process leverages the immutable versioning provided by the filer architecture, preferably together with the fast restore processing, as is now described.

The method begins at step 900 with a test to determine whether a ransomware attack has occurred or is occurring. This step may be carried out at a particular filer (using the ransomware detector), or at the cloud controller (based on the notifications or other event data provided by the one or more filers). If no attack is indicated, the step cycles. Preferably, the test at step 900 operates continuously, and it may be set up on a per-volume basis. If, however, the outcome of the test at step 900 indicates an attack, the process continues at step 902. At this step, read and write access to the affected volume, e.g., from all EAs connected to that volume, is shut down. The method continues at step 904, wherein the local cache in each impacted EA/filer is flushed (sometimes referred to herein as a "snap-to-cloud" operation). At step 906, a new/clean recovery EA/filer is automatically spun up in the cloud. This filer is sometimes referred to herein as a recovery filer that is then "activated" in response to the detected ransomware attack. In a variant embodiment, a recovery filer is spun up in advance of the ransomware detection and is placed on standby in the event it is needed; when needed, the standby filer is then "designated" as the recovery filer. Whether activated on-demand or designated in advance, the recovery filer is created for the purpose of serving as the filer that facilitates the creation of a new source of truth about the volume, namely, the notion that the volume associated with the recovery filer is uncorrupted by the ransomware attack.

At step 908, the system initiates a restore operation using the recovery filer. In a preferred embodiment, the restore operation uses the audit trail(s) provided by the EA audit components and the fast restore technique (described above) to reverse the damage of the individual files or to provide broader (e.g., directory-level reversals). There is no requirement that the fast restore operation be utilized. The nature, extent and timing of this damage reversal operation will depend on the particular attack vector. As an example, the system first makes a list of every file worth restoring. Using this file list, the fast restore operation is then looped, restoring the file system as close as possible to its pre-infected state, but without requiring any copy back operations. To facilitate a fast restore, and when multiple filers share the volume, global file locking across the volume also is disabled, as are any firewalls that would other perform snapshot retention.

Referring back to FIG. 9, at step 910 (and following completion of the restore, a new clean snapshot of the volume is created from the recovery filer. This is sometimes referred to as executing a push or a commit. At step 912, a test is performed to determine whether an impacted filer (i.e., one connected to the volume impacted by the attack) has completed merge operations to the new clean snapshot of the volume. A merge checks to determine whether the contents of the filer cache are "good" with respect to the new clean snapshot derived from the recovery filer. Step 912 ensures any EA that may be still stuck (in a previous (corrupt) snapshot) does not continue to infect (or re-infect) the volume. If not, the operation cycles until merging is completed. When merging is completed, as indicated by a positive outcome of the test at step 912, the routine continues at step 914 to re-enable all read and write access to the volume from the impacted filer. This completes the processing.

Steps 912 and 914 are carried out on a per-impacted filer basis, and a first filer may complete its merge operation to the new clean snapshot before a second filer completes its merge operation; in this case, the first filer is brought back online before the second filer. In other words, the determination of when a particular filer (or clients connected to that filer) can interact with the volume is filer-specific, as there is no requirement that all impacted filers must complete the merging before access to the volume is re-enabled.

The technique described above may be practiced with respect to a single filer and a single volume in the cloud, and wherein the single filer is acting as the recovery filer.

As a variant, the system may also be configured to ensure that the snapshots containing the encrypted (ransomware-damaged) files cannot be accidentally restored by an operator or end user.

To facilitate the above-described processing, the global file system is configured such that the enterprise customer has audit trail enabled for all writes, as well as an appropriate retention policy set for a relatively long time period (e.g., in months). Some or all of the described processing may be implemented in a recovery script that is pre-deployed to the impacting filers, or deployed on-demand. The recovery script itself may be used to detect the signature of the ransomware after the attack has already taken place. By using deployable recovery scripts, the service provider can tune the script to the attacker after the attack, while still enabling the customer to walk back in time through the versioning system to reverse the damage to the file system.

As noted above, and when the ransomware attack is detected, access to the corrupted (poisoned) volume from the one or more filers sharing the volume is shut down such that the filers cannot communicate with the cloud. This was step 902 in the process flow in FIG. 9. If a particular filer itself is not poisoned (even though the volume is), however, there is no requirement that the uncorrupted filer needs to limit client access (to the filer), as those clients can continue working (performing read and write accesses) to the filer's cache. With respect to a filer that itself is corrupted, however, all client access to that filer is also disabled upon detection of the ransomware attack. Thus, in an alternative embodiment, there are first and second filers associated with the volume, with the first filer being uncorrupted when the attack is detected, but wherein the second filer is poisoned by the attack. In such case, step 902 still dictates that both the first and second filers have their access to the poisoned volume disabled (and also that client access to the second filer is disabled), but client access to the uncorrupted first filer need not be disabled. For the second filer, there is also no requirement to carry out the merge operation with respect to the new clean snapshot, as the contents of the second filer are already "good."

The techniques herein provide significant advantages. The versioned file system architecture provides for built-in unlimited and frequent snapshot capability to recover file shares (filers sharing a volume) from a ransomware attack (or even other disasters, such as fire or equipment failure) within minutes. File data in use at all locations is easily restored in a fraction of the time of traditional back-up recovery techniques. With the approach described herein, the enterprise simply dials back to the very point in time before the attack occurred. The customer has flexibility to restore specific files, directories, or even entire volume(s) to surgically recover just the files that were corrupted, e.g., to within a very short time frame (e.g., a minute) prior to the attack. The approach herein also enables the customer to focus on restoring only the files that have been affected (as opposed to the entire volume), which provides for even greater time efficiencies being realized for the overall recovery process.

Ransomware Detection

As noted above, a primary goal is to detect the ransomware attack as soon as possible to limit the damage and simplify the eventual clean-up requirements. While there is no particular technique that can detect any and all ransomware attacks, because the filer is located in-between the end user and the immutable versions (which are typically encrypted) in the cloud, the architecture described above has access to a large amount of information that can be used to detect a possible ransomware attack. These (often disparate) information sources are useful to facilitate early ransomware attack detection, as is now described. A preferred approach implements a scoring-based ransomware detection system as a pluggable framework wherein a set of tests are implemented to "score" various ransomware markers (e.g., rate of change on "suspicious" activity, and the like) that, when taken together, provide a reliable early indication of an attack.

In one example embodiment, there are several sources of relevant information, e.g., (1) data from an audit sub-system (such as audit component 804 in FIG. 8), (2) data from a metrics sub-system; and (3) direct file examination (e.g., checking file "magic numbers," checking filenames, checking for related files like ransom demands, and the like). The precise sources of data are not intended to be limiting, as any available data sources can be used by the framework scoring system. In this embodiment, it is assumed that there is an individual test associated with an occurrence or situation that is likely to indicate a ransomware attack in progress, and that contributes a value to an overall score. There are assumed to be multiple such tests (each associated with a ransomware marker of interest), and typically the tests differ from one another. Each test provides its own independently-derived score, and the scores (from the several tests) are aggregated to generate an overall (or aggregate) score. A magnitude of the overall score is associated with a confidence of the ransomware detection system that an attack is in progress. If the aggregate score rises above a certain first configurable value, there is a certain amount of assurance that a ransomware attack is in progress; as the aggregate score rises further, there is still additional assurance that a ransomware attack is in progress. In this approach, test scores do not have to all be positive values; a test that indicates a ransomware attack is not happening may return a negative score, thus lowering the overall aggregate score (i.e., the confidence that an attack is occurring).

The scoring-based ransomware detection system is configurable. Given the wide range of data and use patterns that customers have, it is assumed that one or more tests useful for a particular enterprise customer may not necessarily work well for another customer. Further, preferably individual tests are configurable, typically in an automated manner, and a given test may be bypassed or have its score adjusted upon a given occurrence or event. Preferably, in the framework one of more of the following are configurable: individual tests, enablement (or not) of an individual test, an individual test score, an action to take when a score exceeds a configurable value, and score may be configured, an action to take (e.g., notify, sandbox, etc.) when a score on a test passes a first threshold, a second threshold above the first threshold, and so forth. Further, the detection system is "pluggable" in the sense that individual tests may be added such that the overall test suite evolves over time.

The following are sample tests that may be used, and a description of the rationale for the test:

(1) Use auditing to track the number of new file creations in a given unit of time. If this value is significantly larger than a usual value for this customer/appliance/volume triple, add to the score. Rationale: some ransomware creates many new files as it encrypts.

(2) Use auditing to track the number of complete file overwrites in a given unit of time. If this value is significantly larger than a usual value for this customer/appliance/volume triple, add to the score. Rationale: some ransomware overwrites files in place (as opposed to creating new files).

(3) Use metrics to track the number of new file manifests appearing in a given push. If this value is significantly larger than a usual value for this customer/appliance/volume triple, add to the score. Rationale: this test catches both the cases above (new file and overwrite) and matches at push time.

(4) Use auditing to track the number of file reads in a given unit of time. If this value is significantly larger than a usual value for this customer/appliance/volume triple, add to the score. Rationale: ransomware needs to read files to encrypt them, and many more reads than expected are suggestive of a possible problem.

(5) Similar to the above, but likely more accurate (thus having a higher score), use auditing to track the number of file reads for files that have not been read in a long time. If this value is significantly larger than a usual value for this customer/appliance/volume triple, add to the score. Rationale: ransomware needs to access old files to encrypt them; it should be suggestive of an attack, e.g., that a client that reads a file that is older than a year only once a week is suddenly reading hundreds of old files an hour.

(6) Examine the magic numbers of a new file. If it matches a known ransomware signature, add to the score.

(7) Examine the filename and extension of a new file. If it matches a known ransomware name or extension, add to the score.

(8) Look for ransom demands. Rationale: many ransomware strains drop a "readme" style file in the directory telling the victim that their data has been encrypted. Those readme files have known filenames that can be monitored. If one is seen, add to the score.

Of course, the above-described tests are merely representative, as the pluggable framework provides a way for new tests to be conveniently added. In a variant embodiment, the ransomware detection system is implemented using machine learning, which is preferably supervised.

The ransomware detection system may be located in a filer, or in a back-end system (e.g., a Network Operations Center (NOC)). The system may be implemented in a hybrid manner, with some tests running on the filer, and some in the NOC.

Once an attack is detected, the above-described ransomware recovery technique is executed.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A computer-readable medium having instructions stored thereon to perform the interface functions is tangible.

A given implementation of the disclosed subject matter is software written in a given programming language that runs on a server on an hardware platform running an operating system such as Linux. As noted above, the interface may be implemented as well as a virtual machine or appliance, or in any other tangible manner.

While given components of the system have been described separately, one of ordinary skill will appreciate that some of the functions may be combined or shared in given instructions, program sequences, code portions, and the like.

Having described the subject matter herein, what we claim is as follows:

1. A method of recovering from a ransomware attack in association with a cloud-based global file system wherein one or more filers are associated with a volume of a versioned file system in a private, public or hybrid cloud object store, comprising:
   detecting that a ransomware attack associated with one or more files or directories of the volume has occurred or is occurring;
   responsive to detecting the ransomware attack, restricting access to the volume; wherein at least write access activity to the volume from at least one filer is shut down;
   flushing a local cache associated with at least one filer;
   activating or designating a recovery filer;
   initiating a restore operation at the recovery filer to reverse damage to the one or more files or directories of the volume;
   upon completion of the restore operation, create a new clean snapshot of the volume using the recovery filer;
   determining whether the at least one filer has completed a merge operation with respect to the new clean snapshot of the volume, wherein the merge operation checks to determine whether contents of the local cache are good with respect to the new clean snapshot created from the recovery filer; and
   upon completion of the merge operation, re-enabling write access to the volume from the at least one filer.

2. The method as described in claim 1 further including disabling global file locking across the volume during the restore operation.

3. The method as described in claim 1 further including inhibiting snapshot retention associated with a filer during recovery from the ransomware attack.

4. The method as described in claim 1 wherein the ransomware attack is detected at a filer or a cloud-based controller.

5. The method as described in claim 1 wherein the restore operation returns a local file system to a point-in-time just before initiation of the ransomware attack.

6. The method as described in claim 5 wherein the recovery filer is activated or designated before or in response to detection of the ransomware attack.

7. The method as described in claim 1 wherein the restore operation reverses damage to one of: a file in the volume, a directory in the volume, and the entire volume.

8. The method as described in claim 1 wherein recovery from the ransomware attack is carried out with respect to the volume and not any other volume in the cloud-based global file system.

9. The method as described in claim 1 wherein recovery from the ransomware attack occurs without copy back operations.

10. The method as described in claim 1 wherein recovery from the ransomware attack occurs over a time period measured in minutes with respect to a point-in-time when the ransomware attack is detected.

11. The method as described in claim 1 wherein the restore operation is carried out using audit trail data.

12. A ransomware recovery software-as-a-service (SaaS), comprising:
one or more filers that are associated with a volume in a private, public or hybrid cloud object store, each filer comprising a physical or virtual machine;
cloud-based infrastructure comprising at least one computing machine, the computing machine comprising computer memory holding computer program code, the computer program code configured to:
detect that a ransomware attack associated with one or more files or directories of the volume has occurred or is occurring;
responsive to detecting the ransomware attack, restrict access to the volume, wherein at least write access activity to the volume from at least one filer is shut down;
activate or designate a recovery filer, wherein before the recovery filer is activated or designated, a local cache associated with the at least one filer has been flushed;
initiate a restore operation at the recovery filer to reverse damage to the one or more files or directories of the volume;
following completion of the restore operation, create a new clean snapshot of the volume using the recovery filer; and
thereafter, re-enable write access to the volume from the at least filer, the at least one filer having completed a merge operation with respect to the new clean snapshot of the volume, wherein the merge operation checks to determine whether contents of the local cache of the at least one filer are good with respect to the new clean snapshot created from the recovery filer.

13. An apparatus configured as a filer, the filer associated with a volume in a private, public or hybrid cloud object store, comprising:
a processor;
a cache;
computer memory storing computer program code executed by the processor, the computer program code configured to:
responsive to detecting that a ransomware attack associated with one or more files or directories of the volume has occurred or is occurring, inhibit at least write access to the volume from the filer;
flush the cache;
initiate a merge operation with respect to a new clean snapshot of the volume, the new clean snapshot having been created at a recovery filer that is activated or designated following detection of the ransomware attack, wherein the merge operation checks to determine whether contents of the cache are good with respect to the new clean snapshot created at the recovery filer, and wherein the merge operation is initiated after a restore operation to reverse damage to the one or more files or directories of the volume has completed;
upon completion of the merge operation, re-enable write access to the filer.

14. A method of recovering from a ransomware attack in association with a cloud-based global file system wherein at least first and second filers are associated with a volume of a versioned file system in a private, public or hybrid cloud object store, comprising:
responsive to detecting that a ransomware attack associated with one or more files or directories of the volume has occurred or is occurring, restricting access to the volume, wherein at least write activity to the volume from the first filer is shut down;
flushing a local cache of the first filer;
designating the second filer as a recovery filer;
initiating a restore operation at the recovery filer to reverse damage to the one or more files or directories of the volume;
upon completion of the restore operation, create a new clean snapshot of the volume using the recovery filer; and
re-enabling write access to the volume from the first filer after the first filer has completed a merge operation with respect to the new clean snapshot of the volume, wherein the merge operation checks to determine whether contents of the local cache are good with respect to the new clean snapshot created from the recovery filer.

* * * * *